W. A. Miles,
Spice Box,

№ 58,455      Patented Oct. 2, 1866.

Witnesses.

Inventor.
W. A. Miles
Per Munn & Co
Attorneys

UNITED STATES PATENT OFFICE.

WALLACE A. MILES, OF MERIDEN, CONNECTICUT.

IMPROVED SPICE-BOX.

Specification forming part of Letters Patent No. 58,455, dated October 2, 1866.

*To all whom it may concern:*

Be it known that I, WALLACE A. MILES, of Meriden, in the county of New Haven and State of Connecticut, have invented a new and useful Improvement in Spice-Boxes; and I do hereby declare that the following is a full, clear, and exact description thereof, which will enable others skilled in the art to make and use the same, reference being had to the accompanying drawings, forming part of this specification, in which—

Figure 1:
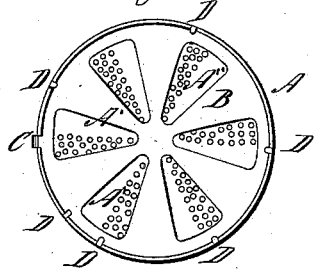
Figure 2:
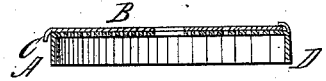
Figure 3:
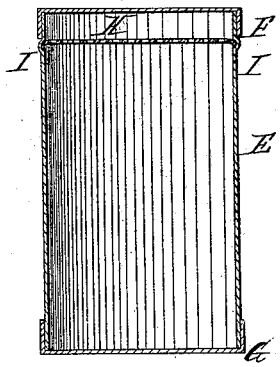
Figure 4:
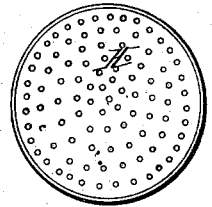
Figure 5:
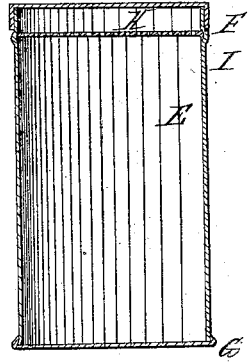

Figure 1 is a plan view of a cover of a spice-box made according to my invention. Fig. 2 is a section. Figs. 3, 4, and 5 represent modifications of my improvement.

Similar letters of reference indicate like parts.

The object of this improvement in spice-boxes is to prevent the loss of the aroma of their contents. This is accomplished by making them tight and close when not in actual use, their tops being so arranged as to be easily and readily opened to allow the spice to be shaken out after the manner of sprinkling or dredging powdered substances out of boxes.

The letter A in Fig. 1 designates a cover of a spice or dredging box, which can be opened and closed at pleasure. It is so made that it can be readily applied and fitted to a box as an ordinary cover is applied. It has a series of rows of perforations, A', made through it in radial lines, the intervals between the rows being left solid. Upon the cover A is placed a supplementary cover, B, consisting of a circular plate having radial slots of the same width as the series of perforations in cover A. The two plates may be connected to each other by a rivet through their centers; but I have shown them connected by means of hooks D on the edge, which are turned over from the circumference of the cover A upon the edge of plate B. These hooks retain the latter plate on the cover, but yet allow it to be rotated when one pushes against the dog C, which projects from the circumference of the upper plate. Two of the hooks D are so placed as to serve as stops to the dog C, to prevent the plate B from being turned farther than just to cover and uncover the perforations A'.

By this means a spice-box, or any box containing substances in a fine state, which are apt to lose their strength by exposure to the air, can be kept closed when not in actual use by merely closing the perforations. The cover A B can be applied to a fresh box after a former one has been emptied.

I have shown a modification of my invention in Fig. 3, where E designates a box having a close cover, F, and a close bottom, G. Within the box, at its upper end, is placed a perforated diaphragm, H, which is pushed downward until it fits in the groove I, made in the inside of the box. The bottom G may be left loose to allow the box to be filled through the lower end, when it can be put on and soldered. The cover F is taken off when the box is to be used, and replaced when it is set aside, so as to preserve the aroma from being lost in the air.

Fig. 4 is a detailed view of the perforated diaphragm H. In Fig. 5 I have shown a box, E, whose bottom G is soldered or otherwise secured tightly before the diaphragm H is fitted in its place, so that the box can be filled through its upper end. The diaphragm is then forced down to the groove I, where it will be held by the elasticity of the sides of the box. The cover F being next put on, the box is closed, so that the volatile portions of the contents will not be lost on the air, as in spice-boxes whose tops are perforated and left uncovered. The boxes E may be put up in this manner by the manufacturer, and thus the original package will serve both to hold the spices while being transported, and also to be used as a dredging or sprinkling box merely by removing the cover which closes the perforations, the removal being effected either by taking off the top cover, or by turning it aside, as in the example shown in Fig. 1.

I claim as new and desire to secure by Letters Patent—

The covers A, having perforations in a radial line, registering with the slotted cover B of a box, operating substantially as described, for the purpose specified.

The above specification of my invention signed by me this 12th day of March, 1866.

WALLACE A. MILES.

Witnesses:
M. M. LIVINGSTON,
ALEX. F. ROBERTS.